Feb. 19, 1935.  L. A. TAYLOR  1,991,473
DIRECTION FINDER
Original Filed Oct. 26, 1932
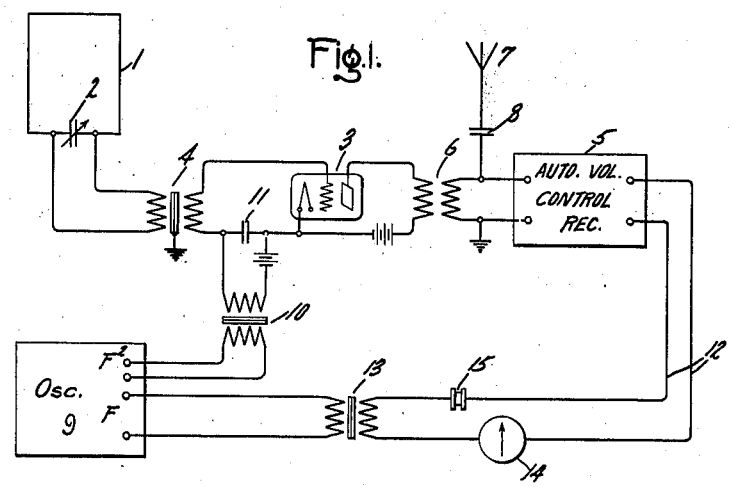
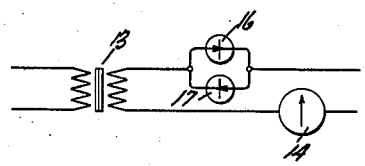
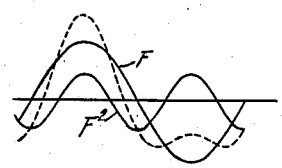 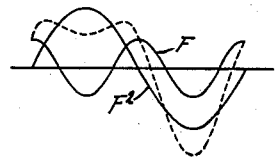
Inventor:
Laurens A. Taylor,
by Chas. E. Allen
His Attorney.

Patented Feb. 19, 1935

1,991,473

UNITED STATES PATENT OFFICE 1,991,473

DIRECTION FINDER

Laurens A. Taylor, Schenectady, N. Y., assignor to General Electric Company, a corporation of New York Application October 26, 1932, Serial No. 639,593
Renewed February 3, 1934

11 Claims. (Cl. 250—11)

My invention relates to direction finding systems and more particularly to an improved direction finding means which is particularly adapted for use on mobile craft, such as ships, airplanes, etc., whereby an indication of the direction of a radio transmitter or course beacon may be obtained.

My invention has for one of its objects to provide an improved and simplified direction finding system which may utilize any radio transmitting station as a beacon or course indicator.

In certain types of mobile craft, such as airships and airplanes, it is desirable to guide these craft to points other than those on the regular air routes which are usually marked by radio and light beacons. In accordance with my invention, I provide an improved, compact and light-weight direction finder which may be utilized by these craft to indicate a course in the direction to or from any broadcast station.

The novel features which I believe to be characteristic of my invention are set forth with particularity in the appended claims. My invention itself, however, both as to its organization and method of operation together with further objects and advantages thereof, will be better understood by reference to the following description taken in connection with the accompanying drawing in which Fig. 1 discloses a preferred embodiment of my invention; Fig. 2 represents a modification thereof; and Figs. 3 and 4 represent the currents present in the output circuit.

Referring to Fig. 1, I have shown therein a directive antenna 1 tuned by a variable capacitor 2 and coupled to an electron discharge device 3 by means of a transformer 4. The transformer 4 is provided by a shield between the primary and secondary windings to maintain the loop antenna 1 balanced with respect to ground. The output of electron discharge device 3 is arranged to be coupled to a suitable demodulator or receiving set 5 by means of a coupling device or transformer 6. The demodulator 5 may include suitable audio and radio frequency amplifiers which are preferably provided with an automatic volume control. A non-directive antenna 7 is connected to the input circuit of the demodulator 5 by means of capacitor 8. An oscillator 9 is provided for supplying a plurality of low frequency oscillations. Oscillator 9 supplies to one of its output circuits a certain fundamental low frequency and to the other of its output circuits an even harmonic of this frequency. It is of course understood that any suitable arrangement for supplying low frequency currents having this relation to each other may be employed, such as a single oscillator generating a plurality of low frequencies and suitable filter circuits connected to separate these frequencies and supply them to separate output circuits. One of these low frequency oscillations, which may be the even harmonic frequency is supplied to a portion of the input circuit of the electron discharge device 3 by means of a coupling transformer 10 of which the secondary winding is connected across a capacitor 11 in the grid cathode circuit. The other or fundamental low frequency oscillations are supplied to the output circuit 12 of the demodulator 5 by means of a coupling transformer 13. The output circuit 12 of the demodulator 5 is provided with the zero center direct current meter 14 arranged in series with one winding of the transformer 13 and a non-linear resistance 15. This non-linear resistance 15 is preferably of the type described in United States Patent No. 1,822,742 issued September 8, 1931, to K. B. McEachron.

The non-linear resistor 15 has a current and resistance relationship which can be expressed in the form of a simple hyperbolic equation as $R = CI^{-a}$ when $R$ and $I$ represent respectively resistance and current while $C$ and $a$ are constants. The exponent $a$ is less than unity and the constant $C$ may range between 10 and 600. This material has the peculiar property of reacting to asymmetrical wave shapes so that a direct current flows in the circuit, but when symmetrical waves are passed through it, no direct current flow occurs.

Fig. 2 shows an alternative arrangement which may be substituted for the non-linear resistance 15. The arrangement disclosed in this figure comprises two copper oxide rectifiers 16, 17 arranged in parallel and in opposite relation to each other. These oxide rectifiers are preferably of the type described in the United States Patent No. 1,640,335 issued August 23, 1927, to Lars O. Grondahl. While these rectifiers are asymmetrical conductors, the arrangement disclosed in this figure operates in a manner similar to the non-linear resistor 15 because of the non-linear voltage characteristic of the oxide rectifiers.

In operation, the antennæ 1 and 7 are tuned to a desired radio station. Any oscillations received by the directive antenna 1 are modulated by the electron discharge device 3 with low frequency oscillations supplied to the transformer 10 by the oscillation generator 9. The modulated oscillations received from antenna 1 are then combined with oscillations received by the non-directive antenna 7 and demodulated by the receiving set 5.

If the loop antenna 1 is at right angles to the direction of the propagation of the received waves, then no received oscillations are impressed upon the grid of the discharge device 3, and accordingly the only oscillations supplied to the demodulator 5 are those received from the vertical antenna 7. If the loop antenna 1 is moved in either direction, however, from the null position, oscillations are received by the loop antenna and are modulated by the electron discharge device 3. If the loop is turned in one direction these oscillations received by the loop combine with the oscillations received from the non-directive antenna in opposed phase relation, whereas if the loop antenna is moved in the opposite direction, the oscillations received by the loop combine with the oscillations received from the non-directive antenna in like phase relation. Thus, the oscillations which are supplied to the demodulator 5 from the non-directive antenna 7 are sinusoidally increased or decreased, dependent upon the position of the loop antenna 1. If the oscillations received from the two antennæ combine in phase, then the low frequency even harmonic oscillations present in the output circuit 12 have a particular phase relation to the low frequency oscillations supplied to the output circuit by the oscillator 9. If the loop antenna 1, however, is in such position that the two oscillations combine in opposed phase relation, then the low frequency oscillations supplied to the output circuit are 180° out of phase with the low frequency oscillations occurring under the previous condition. The low frequency currents in the output circuit 12 have a particular phase relation to the fundamental frequency supplied to the output circuit by the oscillation generator 9. This particular phase relation which changes as the loop antenna is rotated from one side of the null position to the other is utilized to provide an indication on the meter 14.

Fig. 3 illustrates the phase relation between the fundamental frequency F supplied to the output circuit by the oscillation generator 9 and the low frequency even harmonic oscillations F² supplied by the demodulator 5 to the output circuit 12. The resultant of the two low frequency oscillation currents is shown by the dotted line. It will be noted that the resultant wave is asymmetrical. When a wave of this sort is passed through the non-linear resistor 15, a direct current will flow in one direction.

Fig. 4 shows the phase relation between the currents F and F² present in the output circuit 12 when the loop antenna 1 has been rotated in the opposite direction. The resultant of these two currents is a wave of similar shape to that disclosed in Fig. 3 but of inverted form. When these currents are passed through the non-linear resistor 15, a direct current flow will result which is in a direction opposite to that occurring when the low frequency oscillations have the phase relationship disclosed in Fig. 3. It is apparent therefore that rotation of the loop antenna 1 in one direction from the null position will cause a direct current flow through the meter 14 in one direction, and rotation of the directive antenna from the null position in the opposite direction will cause a flow of direct current through the meter 14 in the opposite direction.

It will be understood, however, that the arrangement disclosed in Fig. 1 will operate with equal efficiency if the fundamental frequency generated by the oscillator 9 is supplied to the input circuit of the electron discharge device 3 and the even harmonic frequency is supplied to the output circuit 12 of the demodulator 5. The automatic volume control provided for the demodulator 5 results in an arrangement which produces substantially constant sensitivity of the indication of angular rotation of the directive antenna 1 irrespective of the signal strength of the radio transmitting station. While I have described the demodulator 5 as being provided with automatic volume control, it is possible to obtain satisfactory results by the use of manual control or other means.

While the arrangement disclosed in Fig. 1 has been described as being particularly adapted for use on mobile craft, the arrangement is also suitable for operation at fixed stations and may be utilized for all purposes for which the ordinary radio compass or direction finder is used. The output circuit 12 may be provided with a reversing switch so the the direction finder may be utilized for guiding a craft in a direction from a radio station as well as in a direction toward a radio station. The output circuit 12 may be connected to a relay or other suitable mechanism arranged to provide automatic steering of the mobile craft.

It will thus be apparent that I have provided a simple and improved direction finder which may be utilized to guide mobile craft in a direction to or from any radio transmitting station.

While I have shown a particular embodiment of my invention. it will of course, be understood that I do not wish to be limited thereto, since many modifications, both in the circuit arrangement and in the method of operation, may be made. I contemplate by the appended claims to cover any such modifications as fall within the true spirit and scope of my invention.

What I claim as new and desire to secure by Letters Patent of the United States, is:

1. A radio direction finding system including directive and non-directive antennæ, an oscillator producing a plurality of low frequency oscillations having a fundamental frequency and an even harmonic thereof, means for modulating oscillations received by said directive antenna with one of said low frequency oscillations, means for combining and demodulating oscillations from said antennæ, and means for combining said demodulated oscillations with the other of said low frequency oscillations to produce a direct current whenever said directive antenna is in a position other than a null position with respect to a transmitting station, said direct current being variable dependent upon the position of said directive antenna.

2. In a direction finding system, the combination of directive and non-directive antennæ, an oscillator producing low frequency oscillations comprising oscillations of a fundamental frequency and an even harmonic thereof, means for modulating energy received by said directive antenna with one of said low frequency oscillations, means provided with an automatic volume control for receiving said modulated energy and energy from said non-directive antenna and producing a resultant current, and means for combining said resultant current and the other of said low frequency oscillations to produce a direct current whenever said directive antenna is in a position other than a null position with respect to a transmitting station, said direct current being variable dependent upon the position of said directive antenna.

3. In a direction finding system having directive and non-directive antennæ, the method which includes generating low frequency oscillations comprising oscillations of a fundamental frequency and an even harmonic thereof, modulating oscillations received by said directive antenna with one of said low frequency oscillations, combining said modulated oscillations with oscillations received by said non-directive antenna, demodulating said combined oscillations to produce resultant low frequency oscillations, combining said resultant low frequency oscillations with the other of said low frequency oscillations, and translating said combined low frequency oscillations with respect to their phase relation to produce direct current.

4. In a direction finding system having directive and non-directive antennæ, the method of operation which includes generating low freqeuncy oscillations comprising a fundamental frequency and an even harmonic thereof, receiving energy from said directive antenna, modulating said received energy with one of said low frequency oscillations, combining said modulated energy with energy received from said non-directive antenna, demodulating said combined energies to produce low frequency oscillations, combining said low frequency oscillations with the other of said low frequency oscillations to produce asymmetrical wave oscillations, and translating said asymmetrical wave oscillations to produce a direct current.

5. The combination, in a radio compass system, of directive and non-directive antennæ, means for producing low frequency oscillations, means for modulating energy received by said directive antenna with said oscillations, means provided with an automatic volume control for combining said modulated energy and energy from said non-directive antenna and for producing resultant low frequency oscillations, means for producing oscillations having predetermined frequency and phase relations to said first low frequency oscillations, and means responsive to the phase relation between said latter low frequency oscillations and said resultant low frequency oscillations for producing a direct current having polarity determined by said phase relation.

6. A radio direction finding system including directive and non-directive antennæ, an oscillator producing a plurality of low frequency oscillations having a fundamental frequency and a harmonic thereof, means for modulating oscillations received by said directive antenna with one of said low frequency oscillations, means for combining and demodulating oscillations from said antennæ and means for combining said demodulated oscillations with the other of said low frequency oscillations, and means including a non-linear resistor for producing a response to said combined low frequency oscillations.

7. The combination, in a direction finding system, of directive and non-directive antennæ, an oscillator producing low frequency oscillations having a fundamental frequency and an even harmonic thereof, means for modulating energy received by said directive antenna with one of said low frequency oscillations, means for receiving said modulated energy and energy from said non-directive antenna and for producing a resultant current, a circuit for receiving said resultant current and the other of said low frequency oscillations, and means including a non-linear resistor connected to said circuit and responsive to the phase relation between said current and said oscillations for producing a direct current having polarity determined in accordance with said phase relation.

8. The combination, in a radio compass system, of directive and non-directive antennæ, an oscillator producing low frequency oscillations and an even harmonic thereof, means for modulating energy received by said directive antenna with said even harmonic oscillations, means provided with an automatic volume control for receiving said modulated energy and energy from said non-directive antenna and producing a resultant current, means for combining said resultant current and said first-mentioned low frequency oscillations, and means including a non-linear resistor and a zero-center meter for producing an indication in response to said combined low frequency currents.

9. In combination, means for directively receiving radio energy, means for non-directively receiving radio energy, means for symmetrically modulating the energy received from said directive receiving means and for then combining said modulated energy with the energy received by said non-directive receiving means, means to demodulate said combined energy thereby to produce a symmetrical wave having a time phase relation dependent upon the orientation of said directive receiving means, means for combining said symmetrical wave with a second symmetrical wave to produce an asymmetrical wave having asymmetry reversible in accordance with the time phase relation of said first symmetrical wave, and indicating means responsive to the asymmetry of said asymmetrical wave.

10. In combination, a directive antenna, means symmetrically to modulate the output from said antenna, means whereby a symmetrical wave is produced from said symmetrically modulated output having a time phase relation dependent upon the orientation of said directive antenna, means for combining said symmetrical wave with a second symmetrical wave to produce an asymmetrical wave having asymmetry reversible in accordance with the time phase relation of said first symmetrical wave, and indicating means responsive to the asymmetry of said asymmetrical wave.

11. In combination, a directive antenna, means to symmetrically modulate the output from said antenna, means whereby a symmetrical wave is produced from said symmetrically modulated output having a time phase relation dependent upon the orientation of said directive antenna, and means to convert said symmetrical wave into a unidirectional current having a polarity dependent upon the orientation of said directive antenna, said means comprising a circuit for receiving said symmetrical wave, said circuit including a bilaterally conducting non-linear resistance and a source of waves forming a component of an asymmetrical wave of which said symmetrical wave is a second component, the asymmetry of said asymmetrical wave being reversible depending upon the time phase relation of said symmetrical wave.

LAURENS A. TAYLOR.